Aug. 2, 1960  R. W. REYNOLDS ET AL  2,947,417
APPARATUS FOR SORTING ARTICLES
Filed April 30, 1952  4 Sheets-Sheet 1
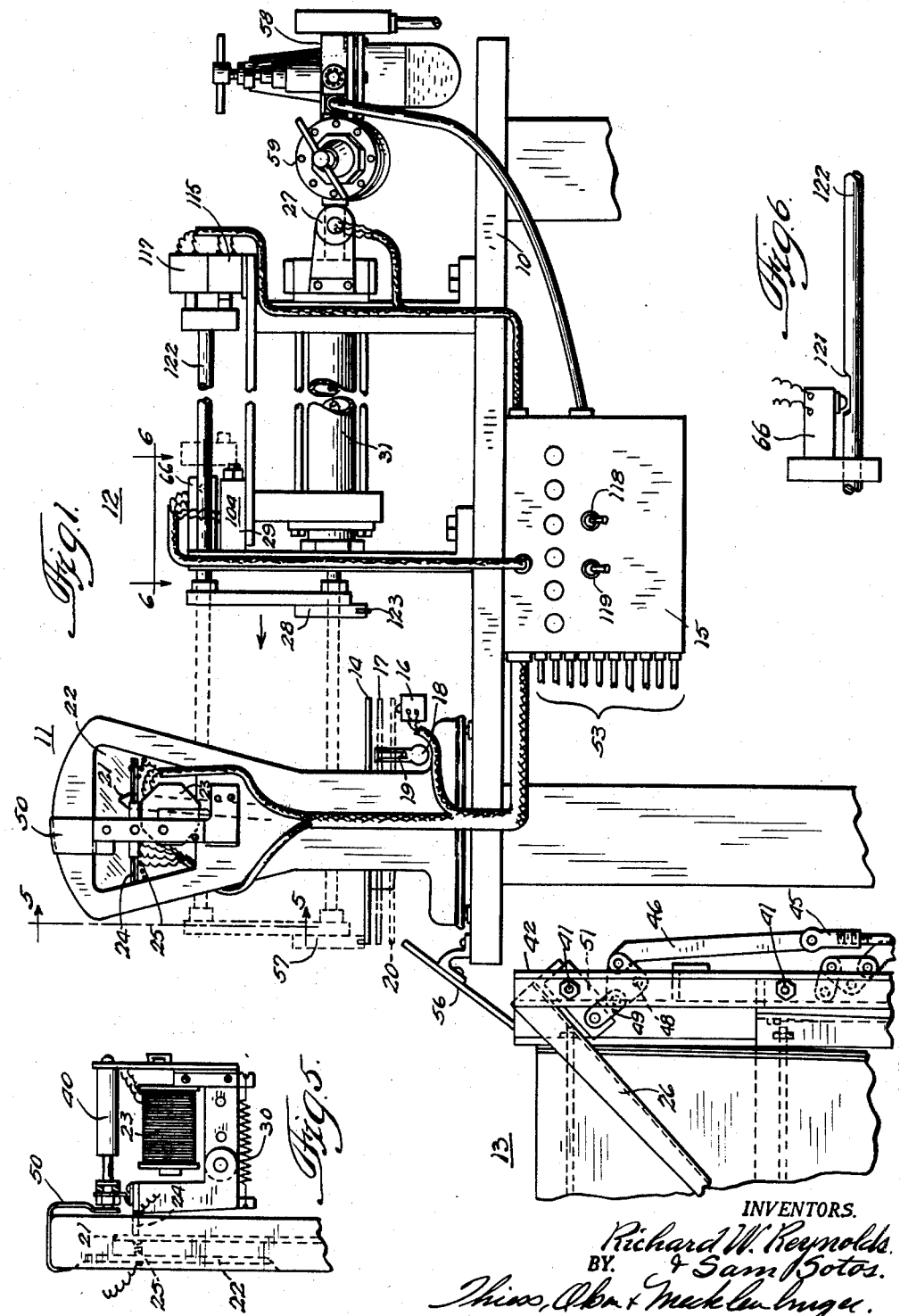
INVENTORS.
Richard W. Reynolds
& Sam Sotos
BY
Thiess, Olson & Mecklenburger
Attys

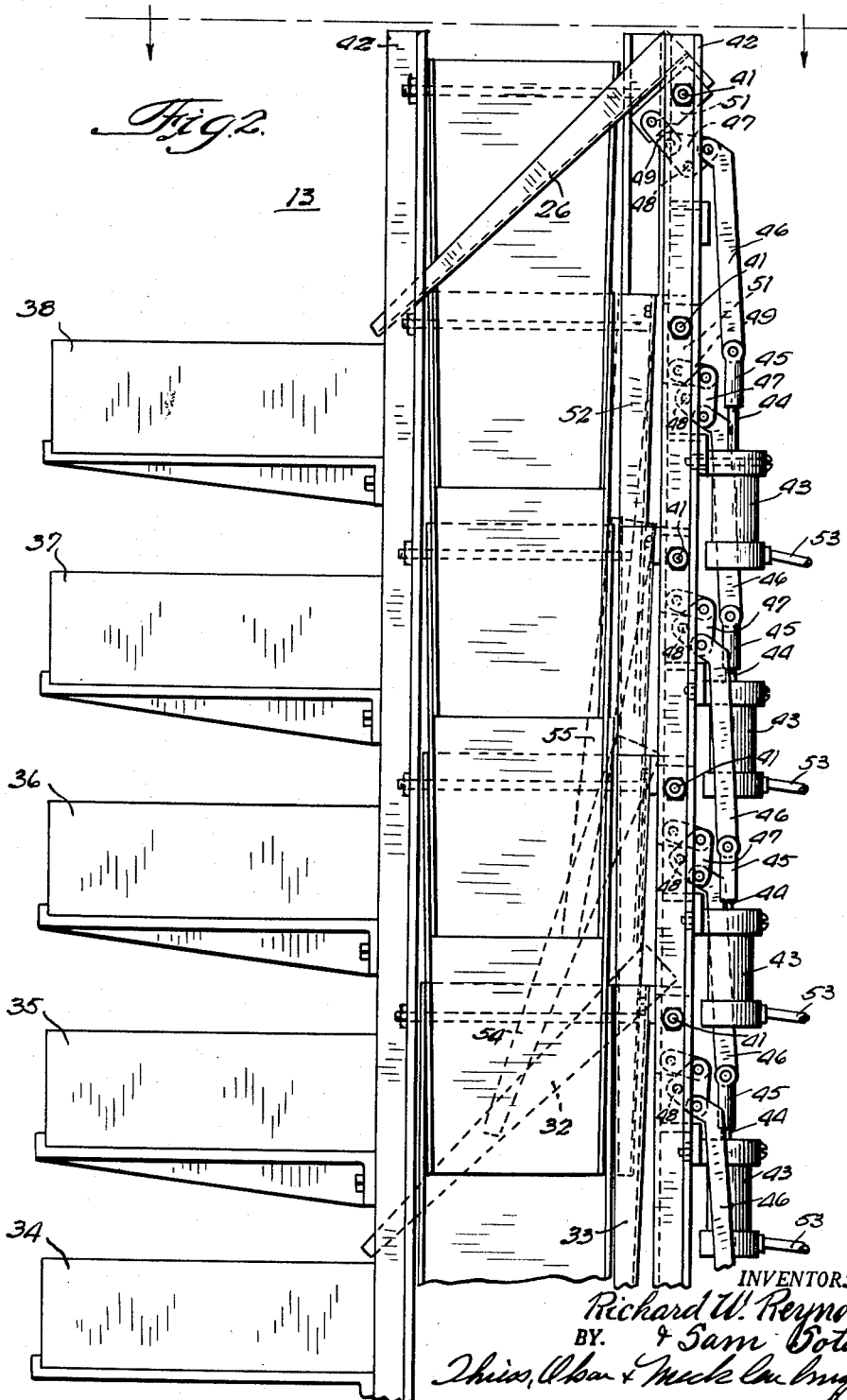

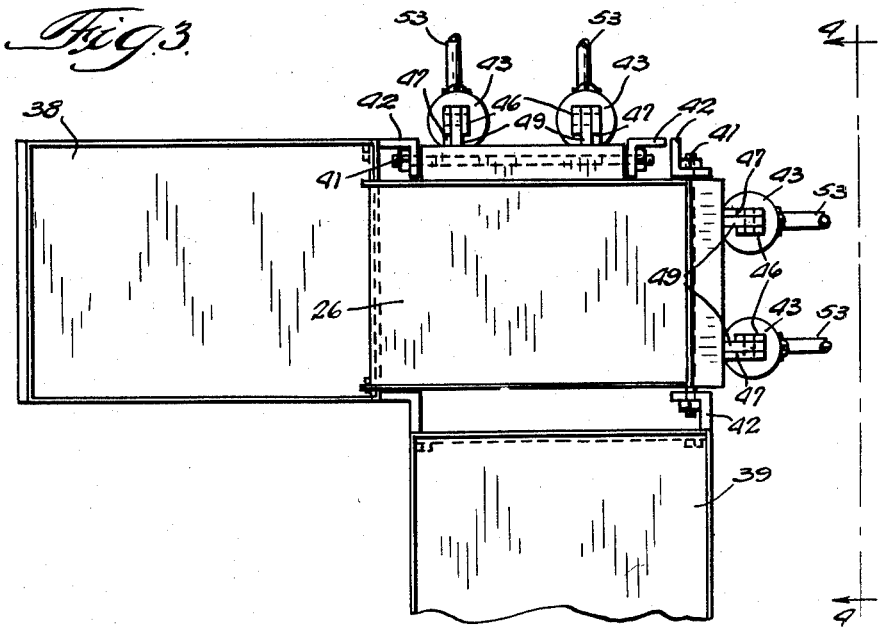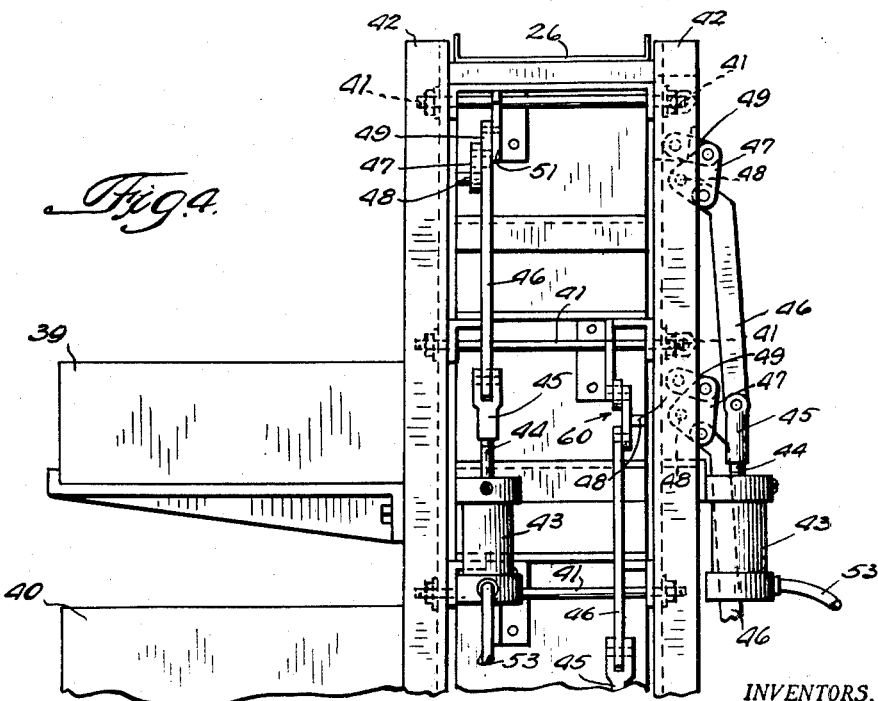

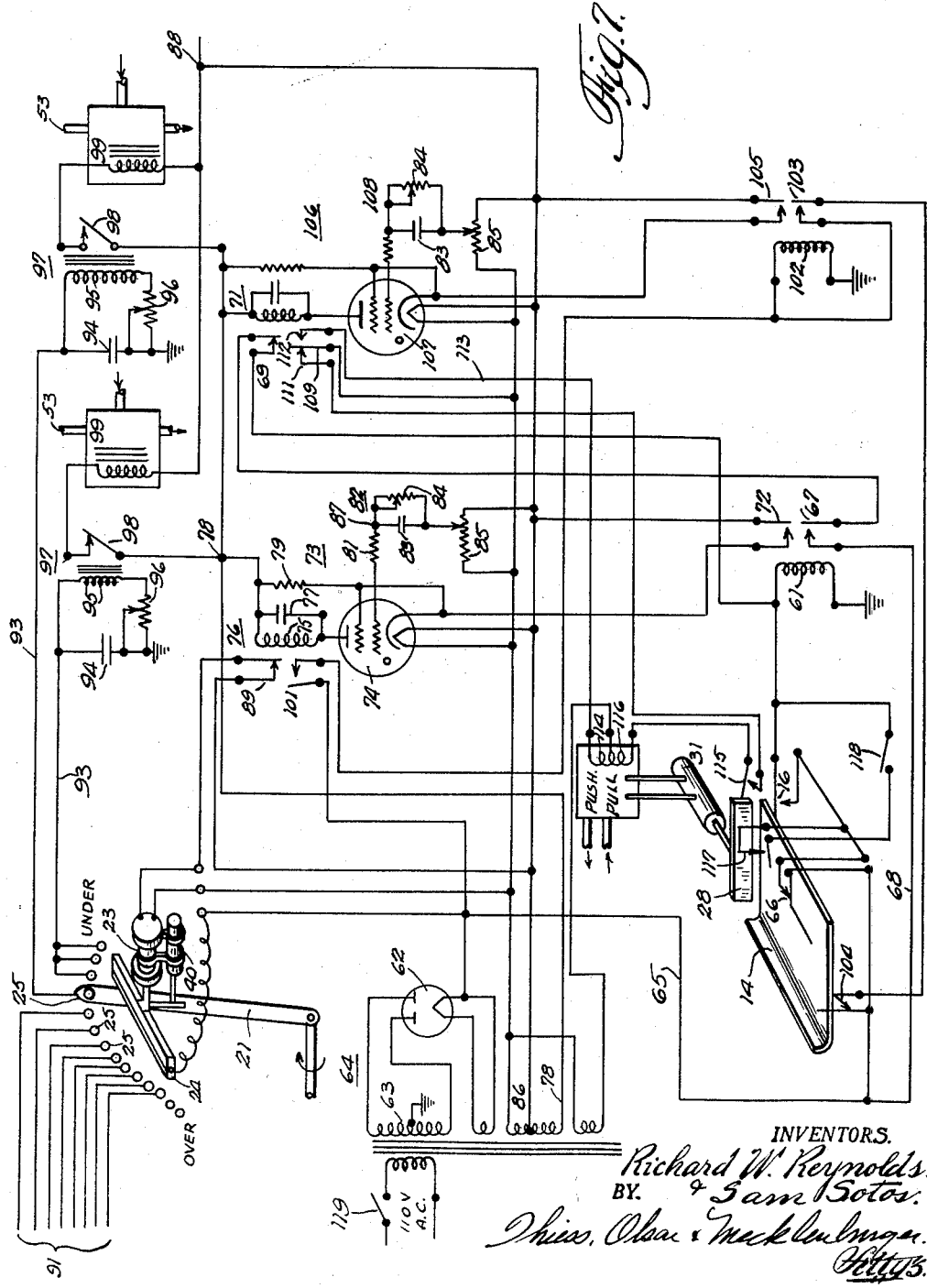

United States Patent Office

2,947,417
Patented Aug. 2, 1960

2,947,417

APPARATUS FOR SORTING ARTICLES

Richard W. Reynolds, 640 E. 89th Place, and Sam Sotos, 8609 S. Euclid Ave., both of Chicago, Ill.

Filed Apr. 30, 1952, Ser. No. 285,232

2 Claims. (Cl. 209—121)

This invention relates to a method and apparatus for sorting articles, and more particularly to a method and apparatus for sorting such articles according to a measured characteristic, such as the weight of each article.

It is a principal object of this invention to provide an improved method and apparatus for sorting articles into a plurality of groups in accordance with a variable characteristic of such articles.

It is a further object of this invention to provide such apparatus which is completely automatic and to which such articles may be fed either manually or by continuous automatic means.

The accurate determination of the weight of articles has heretofore been a slow and tedious process, and has included the human element in the measuring and recording of the data. This is necessarily time consuming and results in frequent human error. In modern merchandising, food products are packaged in small quantities by the processor to facilitate easy merchandising by relatively unskilled personnel. In the meat industry particularly it is a great advantage to cut, weigh, price and package steaks, chops or the like at the packing house, so that a retailer, without the services of a butcher, may successfully merchandise such products. In order to economically accomplish this weighing and pricing it is advantageous to automatically, by a continuous process, place individual articles on a weighing platform, determine the weight of such an article, and then sort it into an appropriate receiver depending on the weight indicated by the measuring device. Then, by various combinations of these weighed articles, packages of uniform weight consisting of two or more articles can be assembled all bearing a uniform price.

Therefore it is an additional object of this invention to provide a completely automatic method of weighing and sorting articles which will operate over any predetermined range of weights and will sort such articles into any number of desired groups, each group representing an increment of article weight.

It is a further object of this invention to provide apparatus which will automatically determine the weight of an article and place such an article in a predetermined corresponding receiver rapidly and accurately, and will then immediately be reset automatically in preparation for a succeeding article.

Additional objects of this invention will become manifest from the description, accompanying drawings and appended claims.

In carrying out this invention in one form, a weighing apparatus is provided which has a movable indicator that will assume a plurality of positions depending upon the weight of an article thereon. Each of said plurality of positions has an electrical contact associated therewith which will, when the indicator assumes that position, complete a circuit therethrough and actuate an article-receiver which corresponds to the weight measured. An ejector will, after a predetermined time, remove the article from the weighing device and cause it to be deposited into the appropriate article-receiver. The ejector then returns to its normal position automatically, the article-receiver is deactuated, and the weighing and sorting apparatus is automatically reset to receive the succeeding article.

For a more complete understanding of the invention, reference should now be made to the accompanying drawings, wherein:

Figure 1 is a view in elevation, partially broken away, of a weighing scale, ejector, and associated article-sorter illustrating one embodiment of this invention;

Fig. 2 is a more complete view of the sorter and article-receivers partially broken away;

Fig. 3 is a top view of the sorter and article-receivers;

Fig. 4 is a side elevation of one article-receiver and its associated actuating mechanism;

Fig. 5 is a side view of the weight indicator and weight-sensing mechanism of Fig. 1;

Fig. 6 is a partial top view of Fig. 1; and

Fig. 7 is a schematic circuit diagram of the electrical portions of this embodiment.

Referring now to the drawings, and more particularly to Fig. 1, an embodiment of this invention is shown which includes a weighing device 11 of the customary over and under balance type mounted upon a bench 10, ejecting apparatus 12 which is adapted to push a weighed article from the weighing platform 14 of scale 11, and sorting apparatus 13 comprising a plurality of sorting trays, i.e. actuated tray 26, each representing one increment of weight and adapted to be actuated when an article of the corresponding weight is present upon the platform 14 of scale 11. Housing 15 includes all of the electrical and pneumatic circuitry which is necessary to automatically coordinate the various operations of this apparatus.

The manner in which the apparatus functions is, generally, as follows:

An article is placed upon weighing platform 14 which causes said platform to be depressed, and because of the inertia of the platform and article, switch 16 is momentarily closed during the oscillatory motion of the platform. The platform then stabilizes in the position indicated by the broken lines 17. Switch 16 is so positioned that an article of maximum weight should not cause platform 14 to rest in the position shown by dotted lines 20. The precise weight at which the scale 11 will operate is determined by the position of counterbalancing weight 18 which is adjusted along beam 19 as is well understood with respect to the balance type of scales. The beam 19 is calibrated along its length and the calibration on said beam will indicate the weight at which scale indicator 21 will assume a central position with respect to the scale face 22.

Upon completion of the circuit which includes switch 16, an electronic time delay begins to function which will allow the oscillations of the weighing platform 14 to damp-out so that indicator 21 will come to rest at an appropriate position corresponding to the weight being measured. After the period determined by the time delay, solenoid 23 is deenergized which allows contact bar 24, under the force of spring 30, to press against the insulated indicator 21 and cause it to engage one of a plurality of contacts 25 secured in face 22, as shown in Fig. 5, thus completing the electrical circuit between contact bar 24 and the appropriate contact 25. Contacts 25 are distributed in a curved line across the face 22 of the scale following the curve generated by the contact on indicator 21, and each contact will thus represent an increment of weight as represented by a small change in the position of indicator 21. These contacts 25 are arranged sufficiently close so that the indicator 21 will always make contact with one or two of the contacts 25. The armature of solenoid 23 also has a damping cylinder 40 adapted to ease the armature motion. Holder 50 is slidably mounted on the frame of scale 11 to provide means to hold the armature away from the indicator when the power is removed from the entire apparatus and protect the delicate parts.

Upon completion of an associated circuit through the appropriate contact 25, a corresponding solenoid type of valve, which is contained in housing 15, will be energized to pneumatically operate a corresponding sorting tray such as tray 26, which is adapted to receive the weighed article and deflect it into a predetermined container. Deflector 56 is provided to insure that the article will follow the desired path. If it is desired, instead of placing the article in a container it may be guided to a conveyor which will distribute the article in any desired manner within the processing plant. A second time delay within housing 15 is energized when contact bar 24 engages indicator 21 and this delay will allow time for actuation of the appropriate sorting tray. After the period of the second time delay elapses a circuit is completed which energizes solenoid 27 to operate a push-pull type of pneumatic cylinder which causes ejector 12 to extend and pusher 28 to engage the weighed article and eject it from the weighing platform 14 and into the article-sorter 13. The article then falls under the force of gravity to be deflected by the appropriate sorting tray. Upon extension of pusher 28 which is indicated by broken lines 57, a normally closed switch 29 is opened. Through additional circuits in housing 15, which will be later described in detail, switch 29 causes solenoid 27 to operate the pull portion of cylinder 31 to retract pusher 28 and reset all of the associated circuits in preparation for an additional article. Additionally, the motion of ejector 12 opens a safety switch 66 shown in Fig. 6, and switch 115 in the "pull" solenoid circuit which is opened upon return of the ejector to its normal position. This removes the air pressure from the "pull" cylinder during idle time and prevents the usually objectionable hissing sound.

The air pressure is provided through a first diaphragm type of regulator 58 which provides the air supply for the article-sorter 13, and a second regulator 59 which provides the ejector pressure.

Fig. 2 shows more clearly the operation of article-sorter 13 and is here shown using a plurality of containers 34—40 to ultimately receive the sorted articles. Each of these containers could be replaced by a conveyor terminal to continuously distribute the weighed articles. If, for example, the weight 18 of scale 11 was adjusted in such a manner that scale 11 had a center indication of 6 ounces, a contact centrally located in the face 22 would energize a circuit which would actuate a corresponding sorting tray 33, which is shown actuated by broken lines 32, and would cause a falling article in the open column of article-sorter 13 to be deflected into container 34.

Each contact 25 which is positioned on face 22 an incremental distance to the left of the center contact represents an incrementally smaller weight determination, and, likewise, each contact to the right of center represents an incrementally larger weight. An example of one weight setting which might be employed with this embodiment is that in which a plurality of meat cuts weigh approximately 6 ounces. By adjusting the weight 18 at the 6 ounce position on the beam 19, the center position, and consequently the center contact and associated circuit and article-receiver, will represent 6 ounces and will be actuated to receive all articles which weigh $6 \pm \frac{1}{16}$ ounces. The exact position of the contacts 25 on the scale face 22 and the number of contacts present will determine the range of each increment and the number of increments into which articles can be sorted. Interchangeable faces 22 may be provided to facilitate the adjustment of this device for varying increments of varying magnitude. Thus, when the contacts 25 are at $\frac{1}{8}$ ounce intervals, if the indicator 21 registered in front of the first contact to the left of the central contact, the weight represented would be $5\frac{7}{8} \pm \frac{1}{16}$ ounces; if the second contact to the left of the central contact were engaged, a weight of $5\frac{3}{4} \pm \frac{1}{16}$ ounces would be represented, and so on to the complete limit of indicator travel.

In this embodiment ten sorting trays are provided, which means that the range of weights is subdivided into ten increments of $\frac{1}{8}$ ounce each. A total weighing range of over an ounce is thus provided and the upper and lower limits of travel of indicator 21 are so arranged that in the event any article is below or above this weighing range, said article will automatically be placed in the appropriate extreme container. The over-range container would be under the article-sorter 13. An overweight article will position the pointer over an inactive contact and the article will fall all the way through article-sorter 13. The ten containers are spaced in two vertical columns mounted at right angles to a hollow sorting column. One column of containers 34—38 is shown in Fig. 2 while the other column has been removed to show the associated sorting trays. The second set of five containers would be mounted in front of the sorting trays of Fig. 2 and are shown in Figs. 3 and 4.

Fig. 3 shows the disposition of containers 34—38 which are adapted to receive all articles weighing 6 ounces or less, and the position of the column of containers beginning with the container 39 at right angles thereto which is adapted to receive all articles weighing more than 6 ounces which would be represented by the contacts 25 to the right of the central contact on face 22. Each container has a sorting tray associated therewith which is actuated from a normally vertical hanging position to an angular position so determined that it will deflect a falling article into the appropriate container. Each of these sorting trays associated with each of the ten containers operates in an identical manner, and an explanation with respect to one should suffice to clearly illustrate the operation of all.

Referring again to Fig. 2, the sorting tray 26 is pivotally mounted upon rod 41 in an appropriate frame made of angle irons 42. The actuating mechanism for tray 26 consists of an air cylinder 43 having a piston rod 44 and a coupling 45 connecting said rod to a pivotally mounted actuating arm 46. The other end of arm 46 is pivotally mounted to a bell crank 47 which is in turn pivotally mounted in the frame about axle 48. A toggle link 49 is pivotally mounted to bell crank 47 and also pivotally secured to a cantilever 51 which is integral with the sorting tray 26. In the normal unactuated position illustrated by tray 52 in Fig. 2, the toggle link 49 is in a substantially horizontal position and the piston rod 44 is retracted into cylinder 43. Upon completion of the appropriate sensing circuit an appropriate three-way solenoid valve 99 in the housing 15 is actuated and air pressure is applied to the appropriate air line 53. Air pressure is applied through air line 53 to air cylinder 43, which causes piston rod 33 to be extended and causes bell crank 47 to pivot about axle 48 which is fixed with respect to the frame 42. This will cause toggle link 49 to force cantilever 51 away from the vertical position and to lift the sorting tray to the position shown by tray 26. In this position the two pivot points of toggle link 49 are aligned with the fixed pivot 48 of the bell crank 47, which forms a firmly locked mechanical member which will be immovable when a falling article strikes the surface of tray 26 and is deflected into the appropriate container 38. After such deflection occurs, the actuating circuit is opened and the air pressure removed from cylinder 43. This will allow an internal spring in air cylinder 43 to return the piston rod 44 to normal and deactuate the mechanism which will allow the tray once again to assume the vertical position shown by tray 52.

An advantage of the tray disposition shown here is both a conservation of space and a compactness of apparatus. An additional advantage of this compactness is the gradual deflection of an article falling through the receiver by the partial deflection by all sorting trays above the actuated tray as shown by the broken lines of Fig. 2. When tray 33 is actuated it assumes the position shown by broken lines 32 to deflect the weighed article into container 34. In assuming this position tray 33 will raise the tray immediately above it and cause it to assume the position illustrated by broken lines 54. Tray 55 is also partially rotated about its axis by engagement at its lower end with tray 54. Thereby a gradual deflection of a falling article is provided which prevents severe shocks and damage to any of the apparatus and also to the article being handled.

A second set of deflecting trays is provided, as shown in Fig. 3, which operates in a manner identical to that described with respect to Fig. 2, but by placing a second set of five trays at right angles to the trays already described, additional space conservation is effected while still maintaining a large number of sorting containers.

Two article sorters may be used to increase the number of classifications to twenty-one by installing a duplicate of the article-sorter 13 in front of the existing sorter. An additional movable diverter would be installed over the entrance to the first sorter which would block entrance to the first sorter when a tray in the second sorter was actuated and would guide the article into the second sorter. This could be controlled by making the relays 97 that actuate the solenoid valves in the second sorter double-pole relays. The second poles of all these relays would be connected in parallel and would serve to actuate the diverter by either electric or pneumatic means. This addition can be extended to any number of sorters by similar means, giving a great number of possible classifications.

As shown in Figs. 3 and 4 the actuating cylinders 43 are staggered to provide the necessary clearance along the sorting column. Fig. 4 shows a side view of the upper portion of Fig. 2 to more clearly illustrate the actuated tray 26 and the associated mechanical linkage. Therein cylinder 43 is shown energized, rod 44 is extended, and bell crank 47 is shown in its actuated position rotated about axle 48. A second actuating mechanism 60 is shown in its staggered relationship and is in the unactuated position.

To more clearly understand the operation of this apparatus, reference should be made to Fig. 7 which is a schematic diagram of the circuit which automatically coordinates the various weighing and sorting operations, and in this figure the weighing platform 14 and indicator 21 of the scale 11 are diagrammatically shown to more clearly indicate the interrelationship of the mechanical and electrical portions of this device.

Upon dropping an article on platform 14 as described above, switch 16 is momentarily closed which will energize relay 61 from a source of direct current, such as rectifier 62 and an associated center-tapped transformer 63 which is energized from an ordinary 110 volt source to form the usual D.C. power supply 64. This D.C. voltage is applied through conductor 65, normally closed safety switch 66, momentarily closed switch 16, and relay coil 61 to ground. Coil 61, when energized, completes a circuit through holding contact 67 to maintain energization of coil 61 from the power supply 64 through conductors 65 and 68, closed contact 67 and normally closed contacts 69 on relay 71. Normally open contacts 72 are also closed by the actuation of coil 61 which will change the potential on the cathode circuit of a time delay device 73. Time delay 73 includes a dual grid thyratron 74 which has the actuating coil 75 of relay 76 in its plate circuit with the customary filter condenser 77 in parallel therewith. The other terminal of relay coil 75 is then connected to one terminal of a source of A.C. voltage 78. The shield grid and cathode of thyratron 74 have a common connection to the A.C. supply 78 through a relatively large resistor 79. Thus while switch contacts 72 remain open, the cathode, shield grid and plate of thyratron 74 are all connected to terminal 78 and all at a common potential. The control grid of thyratron 74 is connected through resistor 81 and timing network 82, which consists of a condenser 83 and resistor 84 to the other terminal 88 of the A.C. source through a potentiometer 85. Potentiometer 85 is connected across the filament voltage source 86 of power supply 64 and provides for small adjustments of the voltage on the control grid of thyratron 74. When switch 72 is open the control grid of thyratron 74 has a voltage present upon it which is of opposite phase with respect to the cathode voltage, and the control grid will therefore serve as a plate. A rectified voltage equal to the supply voltage, here 110 volts, will charge condenser 83 through the control grid so that point 87 will be at a large negative potential with respect to the voltage at terminal 88 of the A.C. source during the major portion of a voltage cycle.

Upon completion of the cathode circuit through switch 72, a voltage will be impressed upon the cathode of thyratron 74 which will tend to cause conduction from cathode to plate during the positive half cycles. Conduction will be prevented, however, by the large negative voltage which is present upon the control grid and will remain upon the control grid as a result of the large negative charge on condenser 83. This negative bias will be dissipated through adjustable resistor 84 and the time constant of the RC network 82 will determine the time delay which this circuit will cause before thyratron conduction can begin.

In this embodiment condenser 83 has a capacitance of .25 mfd. and resistor 84 is 5 megohms. This will provide an adjustable time delay up to several seconds which is more than is necessary to allow the oscillatory motion of platform 14 and indicator 21 to be damped out to give a proper weight indication when relay 76 is actuated.

Upon the expiration of the time delay thyratron 74 conducts and relay 76 is energized. Actuation of relay 76 opens contacts 89 and de-energizes the normally energized solenoid 23 which allows contact bar 24 to engage indicator 21, shifting said indicator from its normally free position to engagement with a contact 25 which corresponds to the weight of the article which is on weighing platform 14. A plurality of such contacts is provided across the face of the scale and each such contact has an actuating circuit associated with it. Only two of these associated circuits are shown, though any number could be employed and the number here used is ten. The remainder of the contacts 25 are shown connected to leads 91 which would lead to actuating circuits identical to circuit 97. The actuating circuit 97, which is connected through conductor 93 to the appropriate contact 25, consists of a large condenser 94, a relay coil 95 and a variable resistor 96. Condenser 94 is provided to maintain actuation of relay 97 after indicator 21 has opened the sensing circuit through contact 25, and the total time such actuation is maintained is determined by the relative magnitudes of condenser 94 and resistor 96. This time delay is provided so that the indicator 21 may be free to move before the article is removed from the weighing platform 14 while the appropriate sorting tray will remain actuated. This is provided to prevent damage to the scale which might result from a locked indicator.

In this embodiment, condenser 94 has a capacity of —40 microfarads and resistor 96 a resistance up to 10,000 ohms, which will provide a time delay of the order of one second. The contacts 98 associated with coil 95 and relay 97 will, when closed, apply the 110 volt source from terminal 78 to solenoid 99 which is contained in housing 15 and will apply air pressure to the actuating cylinders 43 to raise the appropriate sorting tray as described above. While only one actuating circuit 97 is here described, it should be noted again that a complete device would include ten such actuating circuits.

Relay 76 of time delay 73 will also complete a circuit through contacts 101 which will energize coil 102 from the power supply 64. The energization of coil 102 will close a holding circuit through contacts 103, normally closed switch 104, and power supply 64. Coil 102 will also close contacts 105 in the cathode circuit of a second time delay 106. Time delay 106 functions in a manner identical with the time delay 73 and the description with respect to that circuit should be adequate to describe the operation of this second delay. Thus, a predetermined time after contacts 105 are closed the large negative charge on the control grid of tube 107 will be discharged through the RC network 108 and conduction through thyratron 107 will actuate relay 71. Upon actuation of relay 71, normally closed contacts 69 will be opened, opening the holding circuit of relay coil 61. This will in turn open contacts 72 and allow the relay 76 to be deenergized, contacts 89 closed, and contacts 101 opened. The closing of contacts 89 will energize solenoid 23 and withdraw contact bar 24 from engagement with contact 25. Contacts 101 will have no effect upon the associated coil 102, as this has been locked-in through contacts 103 and normally closed switch 104.

Actuation of relay 71 will also cause transfer contact 109 to move from contact 111 to engagement with contact 112. This will complete the circuit from one side of the 6 volt supply 86 through contacts 109 and 112, conductor 113 and the "push" solenoid 114. This will open a solenoid valve allowing air pressure to cause cylinder 31 to extend pusher 28 and remove the weighed article from the weighing platform 14. Pusher 28, when motion commences, will allow normally closed switch 115 to move to a closed position, will open normally closed safety switch 66, and upon completion of its extending motion will open normally closed switch 104. The opening of normally closed switch 104 will deenergize coil 102 which has heretofore been maintained through contacts 103 and normally closed switch 104. This will allow contacts 105 to open and thus open the circuit through thyratron 107. This will deenergize relay 71 which will close contacts 69 and cause transfer contact 109 to engage contact 111. The closing of contact 69 merely resets the holding circuit of coil 61 for subsequent operations, and the completion of the circuit through contacts 109 and 111 will deenergize the "push" solenoid 114 and energize the "pull" solenoid 116. This will cause the valve to shift to the pull position and operate cylinder 31 in the opposite direction and pusher 28 to retract to its normal position. Upon retracting, normally closed switch 104 is once again closed to prepare for subsequent weighing operations, normally closed switch 66 is closed after pusher 28 has cleared scale platter 14 (see Fig. 6), and the momentary one-way contact switch 117 makes an instantaneous contact as pusher 28 reaches the end of its retracting stroke.

Momentary contact switch 117 is in series with a manually operated switch 118, and these are in parallel with the starting switch 16 which is closed by the initial placing of an article upon weighing platform 14. By closing manual switch 118 the weighing apparatus will thus continuously recycle whether or not an additional article is placed on the platform and thus momentary contact switch 117 in effect replaces switch 16. This type of operation is desirable where the machine is being manually fed with articles to be weighed, as in that event the machine will determine the speed at which the operator works and will increase production over operation in which the operator has the control of the speed of the machine.

Normally closed switch 66 is provided in order to insure normal operation of the automatic features of this device in the event that an article which is extremely heavy or two articles are coincidentally on the weighing platform. In such an event switch 16, which is adapted only for momentary closure, would remain completed and thus the opening of contacts 69 in the second time delay circuit 106 would not deenergize coil 61 and consequently relay 76 would remain energized through contacts 72 which would keep contacts 89 open and consequently allow contact bar 24 to remain in engagement with indicator 21 to prevent any motion thereof. Additionally, contacts 101 will maintain actuation of coil 102 and consequently contacts 105 remain closed. This will prevent the "pull" solenoid from being energized. If such a circumstance exists removal of the article from the weighing platform 14 by pusher 28 will not allow the weighing platform 14 to return to its normal position, as it is mechanically linked to the indicator 21 which is now locked in a position indicating that a weight is present on platform 14. If this circumstance exists the automatic recycling of the apparatus will be stopped and an operator would, of necessity, have to break the locked circuit at some point, such as the off-on switch 119 which controls the entire apparatus.

To insure against such an eventuality, switch 66 is provided and is more clearly shown in Fig. 6. Switch 66 is normally closed but upon a short extension of pusher 28 and before plastic wiper 123 is in mechanical contact with scale platform 14, the switch 66 will be opened by engagement with the cam surface 121 of rod 122 as illustrated in Fig. 6.

Starting switch 16 may be replaced with a photo-electric circuit. The light beam will be arranged so that an article falling on the scale platter will cut the beam and thus establish the momentary contact necessary to initiate operation. This type of arrangement would make it possible to eliminate safety switch 66 because it would eliminate the possibility of the "locked pointer" problem.

Thus it can be seen that a completely automatic weighing device is provided which can sense any predetermined range of weights in any number of increments, the number of increments being determined only by the number of contacts 25 which are spaced across the face 22 of scale 11. Such a device completely eliminates the human elements of error and misjudgment in the weighing operation, and is capable of automatically weighing and sorting articles at a speed far greater than that of a human operator.

While a single embodiment of this invention is shown herein, it will be obvious to one skilled in the art that the invention is not limited thereto since many modifications may be made without departing from the scope of this invention. It is therefore contemplated to cover any such modifications as fall within the true spirit and scope of this invention by the appended claims.

We claim:

1. Apparatus for automatically sorting articles in accordance with the magnitude of a variable characteristic comprising a measuring device having a sensing means to determine the magnitude of said characteristic including an indicator movable in a plane to a plurality of positions intermediate the extremes of movement thereof, said positions corresponding to various magnitudes of the said characteristic, a plurality of contacts associated with said sensing means, each contact corresponding to a predetermined magnitude of such a characteristic, and an electric circuit for each of said predetermined magnitudes and including a corresponding contact to complete the appropriate electric circuit when said contact is energized by the movement of said indicator normal to the indicating plane, means for shifting said indicating means transversely relative to said plane at a predetermined time during each sorting cycle, means defining an open vertical article path through which said articles may freely fall when received from said sensing means, and a plurality of article receivers disposed along said vertical article path, each of said receivers being operatively connected to a corresponding actuating means which is actuated by a corresponding completed one of said electrical circuits and comprising a tray normally in a vertical position and assuming an angular position in said article path when actuated, means corresponding to each tray positioned to receive such an article when deflected, and means to rigidly support said tray in said angular position when actuated by the corresponding actuating means.

2. Apparatus for automatically sorting articles according to weight comprising a weighing device having an indicator which assumes a plurality of indicating positions intermediate the extremes of indicator travel, each indicating position corresponding to a predetermined weight, an electric circuit associated with each of said positions having a contact at the associated position which completes said electric circuit when the indicator assumes said position, article receiving means defining an open article path through which said articles may freely fall when received from said weighing device, a plurality of pivotally mounted trays normally in a collapsed position and assuming an angular position in said article path when actuated to deflect said articles, receptacle means corresponding to each tray positioned to receive such an article when deflected, and a means responsive to each of said electric circuits to move the corresponding tray to said angular position and rigidly support said tray in said angular position.

References Cited in the file of this patent

UNITED STATES PATENTS

| | | |
|---|---|---|
| 1,563,446 | Sholtz | Dec. 1, 1925 |
| 1,712,700 | Hardenbergh | May 14, 1929 |
| 1,722,751 | Jones | July 30, 1929 |
| 1,835,186 | Schoonenberg | Dec. 8, 1931 |
| 1,996,189 | Biro | Apr. 2, 1935 |
| 2,121,227 | Haegele | June 21, 1938 |
| 2,308,729 | Walter | Jan. 19, 1943 |
| 2,323,023 | Flanagan | Jan. 29, 1943 |
| 2,346,122 | Weckerly | Apr. 4, 1944 |
| 2,392,856 | Martinec | Jan. 15, 1946 |
| 2,568,255 | Schieser | Sept. 18, 1951 |
| 2,710,690 | Van Steyn | June 14, 1955 |